June 21, 1966  P. J. BOORAS  3,256,838
BREADMAKING PROCESS AND APPARATUS
Filed May 22, 1961  2 Sheets-Sheet 2
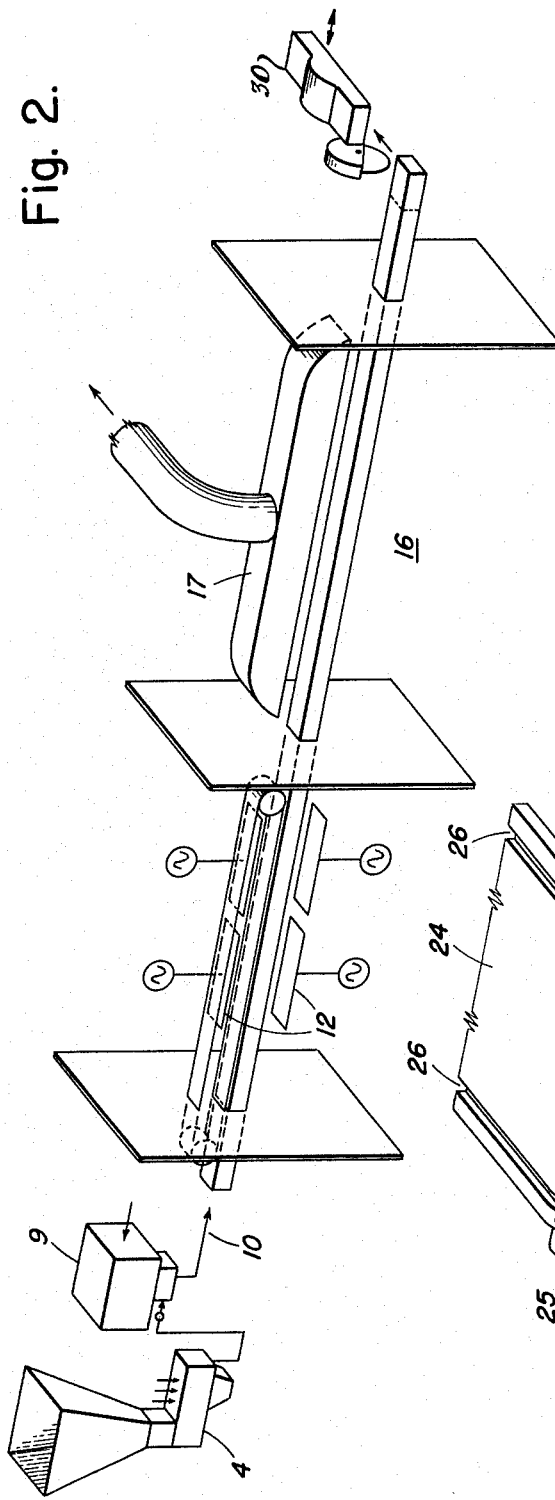
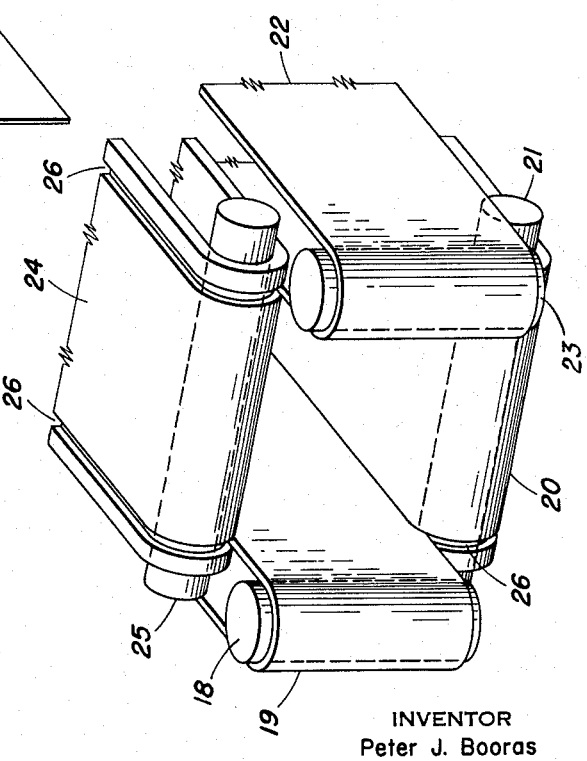
INVENTOR
Peter J. Booras
BY
Morgan, Finnegan, Durham & Pine
ATTORNEY

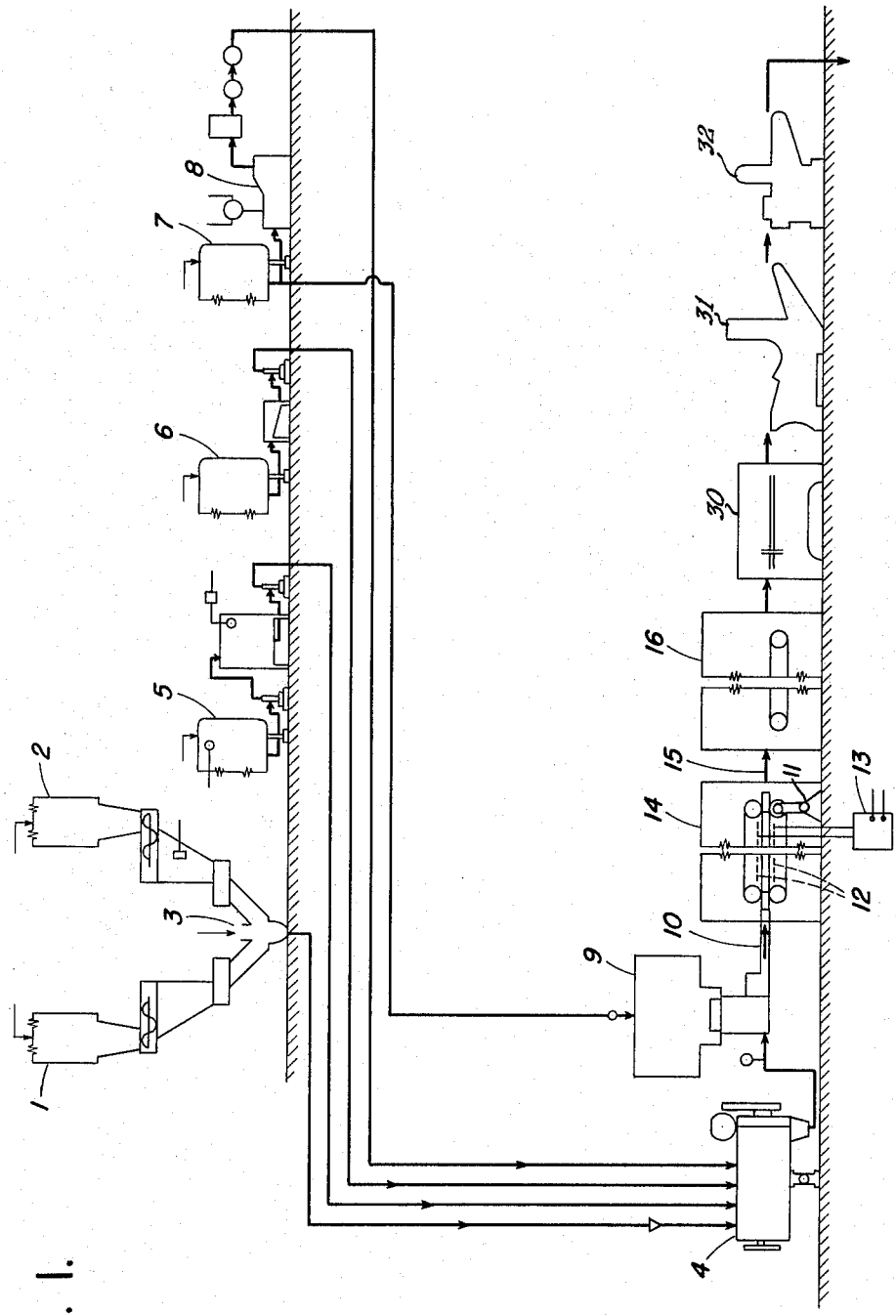
Fig. I.

United States Patent Office 3,256,838
Patented June 21, 1966

3,256,838
BREADMAKING PROCESS AND APPARATUS
Peter J. Booras, 19 Gurnsey St., Keene, N.H.
Filed May 22, 1961, Ser. No. 112,747
13 Claims. (Cl. 107—4)

This application is a continuation-in-part of application Serial Number 736,786, filed May 21, 1958, now abandoned.

The present invention relates to improvements in continuous automatic bread-manufacturing processes, and apparatus therefor.

In prior art processes, it is conventional to use an individual pan for each loaf of bread. Even in cases where a continuous bar of bread dough is taught as desirable, individual pans are suggested for containing the dough during the proofing stage and during the development of said dough due to leavening action. One of the advantages of my invention is the elimination of the need for pans through the use of a multi-sided conveyor means which acts both to advance the dough through the baking zone and also acts as a confining means for said dough, such that the function of the pan of the prior art is incorporated into my combination conveyor-and-shaper. Prior art methods usually consist of a series of distinct and continuous stages or steps. Intermediate these stages there often exists environmental change, particularly with respect to humidity in the temperature and the like which tend to affect the uniformity of the finished product. My invention eliminates this lack of continuity, by eliminating the use of separate pans by providing a uniform bar of dough for baking by means of extruding said dough from a master batch, and by assuring uniform rising of the dough by the use of metered amounts of leavening agents. Typical of the leavening agents which may be employed is carbon dioxide, which is preferred. Other suitable leavening agents will be well understood in the art. In this connection it should be pointed out that the leavening agent, per se, forms no part of the present invention, and any suitable material may be used so long as it performs the function of raising the dough.

When carbon dioxide is used as the leavening agent, it is supplied in an aqueuos solution to the dry ingredients which go to make up the dough. In order to insure uniformity of rising, amounts of carbon dioxide may be supplied to the wet dough prior to extrusion to give primary rising of the dough. Alternatively all the $CO_2$ necessary for leavening could be supplied directly to the dough as a gas and the water solution of $CO_2$ omitted. An important advantage in using carbon dioxide as the leavening agent is the elimination of the usual proofing period involved when yeast is used. This results in the elimination of some seven hours which is taken up when conventional proofing or development of the dough by yeast is employed. The greater control of the amount of leavening agent possible when carbon dioxide is used results in a more uniform product, as well as greater ability to vary the fineness or consistency of the loaf.

An object of this invention is the elimination of the use of individual loaf pans in the manufacture of bread.

A further object of this invention is the production of bread slices which are individually and collectively of uniform texture.

A still further object of this invention is the elimination of the proofing step required by the use of yeast as a leavening agent.

Another object is the provision of such a heating means that dielectric heating will not only bake the bread, but also indirectly cause the bread to be browned.

Other objects and advantages of the invention will be set forth in part hereinafter and in part will be obvious herefrom, or may be learned by practice with the invention, the same being realized and attained by means of the steps, methods and compositions of matter pointed out in the appended claims.

In the accompanying drawings, forming part of the specification and in which like numerals are employed to designate like parts throughout the same:

FIG. 1 is a flow diagram of the bread manufacturing process of my invention.

FIG. 2 is an isometric expansion of the mixing, baking and cooling zones.

FIG. 3 is a fragmentary perspective of the oven conveyor belt.

According to the present invention the dry ingredients of the dough are conveyed from conventional storage means 1, 2, 3 to a mixer 4 in the proper proportions, and have added to them shortening from a storage vessel 5 which can be conventionally supplied with a heating means to insure flowability and sugar solution from vessel 6. The piping leading from the shortening storage vessel to the dough mixer 4 may be heated as well. Carbon dioxide which is stored under pressure in vessel 7 is used to treat water in carbonator 8, which treated water is used to adjust the liquid content of the dough and supply it with a leavening agent in the form of the carbon dioxide dissolved in the water. The ingredients are mixed until homogeneous. The fluid mixture is then pumped to the developer where the gluten further develops to give the dough good cohesion and gas-retaining properties. Carbon dioxide gas may be added directly to the dough in developer 9 from carbon dioxide storage vessel 7, in the event insufficient gas was added with the water used to adjust the liquid content of the dough in the mixer 4, so that it will contain 800–3,000 cubic centimeters, preferably 1,100–1,500 cubic centimeters, of carbon dioxide at standard temperature and pressure per each 18 ounces of dough prior to extrusion depending upon the degree of lightness desired. Developer 9 contains mixing means which in conjunction with the carbon dioxide's pressure further incorporate this leavening agent into the dough. The details of the apparatus from which the dough ingredients are dispensed, mixed, carbonated and developed are of well known construction, and accordingly are not shown in the drawings.

The dough when properly developed is extruded as a continuous leavened plastic mass, the leavening occurring as the pressure which is exerted on the dough in the developer 9 is released when the dough is extruded from the mouth of extruder 10.

The bar of leavened dough upon being extruded is taken up by a vapor-porous tubular conveyor consisting of four endless belts running in the same direction internally with respect to the major axis of the tube they form and lapped in such a manner as to provide a confining surface for the continuous bar of bread having a rectangular cross section. Details of the conveyor are shown in FIGS. 1, 2, and 3. FIGS. 1 and 2 show schematically that heating means 12 may be positioned within the folds of each of the individual belts making up the conveyor. Any suitable heating means may be used. Particularly useful are dielectric plates capable of producing a dielectric field, through which the continuous rod of leavened dough passes. When dielectric plates are employed, care must be taken to space the plates so as to prevent arcing. As shown in FIG. 1, the dielectric heating means 12 may comprise plates connected to a high frequency generator 13 which produces a frequency of from 2 to 60 megacycles and which will preferably be operated at 15 megacycles to cause baking of the dough to form bread. Dielectric heating means are especially advantageous in that they may be used in conjunction with and form a part of belting of a proper character, for instance flexible woven glass fabric, reinforced fluorinated hydrocarbon polymers or reinforced silicone rubbers coated or impregnated with about 5–30% of a finely divided heat dissipative conductance. The composite belt may be made porous by any conventional technique, which will be understood to those of ordinary skill in the art. For example, it has long been conventional and well known in the manufacture of window screens to precoat the strands of wire, glass, etc. with a plastic material before weaving the strands into the screen mesh. This same conventional technique could be used in the present invention. Thus, for example, where the composite belt is formed of glass fabric having a suitable heat dissipative conductance, the porosity may be maintained by coating or impregnating the glass threads prior to weaving and thereafter loosely weaving the threads in forming the belt. The heat dissipative conductance may be applied to the glass fabric by coating or impregnating the fabric with a suitable fluorinated hydrocarbon polymer containing the heat dissipative conductance, for example, tetrafluoroethylene polymer containing carbon black. Alternatively, the composite belt could be made solely from tetrafluoroethylene polymer containing carbon black. Metallic copper can be used in place of carbon black as a heat dissipative conductance. The composite belting may be caused to heat up by the dielectric field produced by the dielectric plates, emitting radiant thermal energy to thereby cause the browning or crusting of the bread. Dielectric heating alone would not cause browning, but the cooperation between the dielectric heating means and the conveyor belting capable of being energized to give off radiant heat does, thus eliminating the need for auxiliary browning means.

The considerations involved in the determination of each variable of the novel baking and browning means though familiar to those skilled in the art are quite complex so that they are best mentioned as guides to those less skilled in this field. The dough in offering resistance to the passage of the dielectric field will be baked at a field strength of from 2 to 60 megacycles. This results in the baking of the dough but does not produce the radiant thermal energy necessary to produce the browning or crusting of bread. Means must be introduced to convert a portion of the dielectric energy to radiant energy by the interposing in the dielectric field a material having a suitable dissipation factor. The amount of such material being governed by the browning temperature which is between 350 and 425° F., its dissipation factor, the amount used, the strength of the field of activating energy and the time of exposure of the dough to the radiant energy.

FIG. 3 shows the arrangement of belts and axles needed to make up a satisfactory tubular conveyor. Lower horizontal belt 20 passes around axle 21, upper horizontal belt 24 passes over axle 25; vertical belts 19 and 22 abut horizontal belts 20 and 24, the edges of which former belts are lapped into grooves 26 on the surfaces of belt 20, which passes over axle 21 and belt 24, which passes over axle 25. Each of the belts is endless, passing around corresponding axles at its other end in order to return. The inner face of each belt moves from the mouth of the extruder through the oven after which the baked loaf may be forwarded on a single-belt conveyor. The drive for the belts may be of any conventional design and is illustrated generally by reference numeral 11 in FIGURE 1.

Upon leaving baking oven 14, the hot bar of bread is passed to a conventional single-belt conveyor 15, which takes it to a vacuum cooler chamber 16 in which is a mild vacuum of about 25 inches of mercury which results in the removal of moist hot vapors from the newly baked bread through exhaust duct 17 and brings about a rapid lowering in temperature. The cooled bread is now cut into loaves by a reciprocable rotary cutter 30; sliced by a conventional slicing machine 31; and wrapped in loaf size packages by a wrapping machine 32 in the conventional manner.

The invention in its broader aspects is not limited to the specific steps, methods and compositions described, but departure may be made therefrom within the scope of the accompanying claims without departing from the principles of the invention and without sacrificing its chief advantages.

What is claimed:

1. In a bread-manufacturing apparatus, the improvements which consists of a four-sided, endless, dough conveyor belt, the inner sides of which move in the same direction, said belt forming a non-collapsing tube of rectangular cross section being formed from flexible non-conductive materials, impregnated with a heat dissipative conductance and means for producing an alternating electric field.

2. In apparatus for the continuous manufacture of bread, conveyor-shaping means and means associated with said conveyor-shaping means to supply heat thereto, said conveyor shaping means comprising a plurality of endless conveyor belts arranged about a substantial portion of the periphery of an extruded bar of bread dough, the inner sides of said belts moving in the same direction whereby said dough bar is advanced and shaped by said belt arrangement, and said heating means including a heat dissipative conductance applied to each of said belts, whereby said dough bar is browned by radiant heat emitted from said belt arrangement.

3. An apparatus as set forth in claim 2 wherein said belts are made of glass.

4. An apparatus as set forth in claim 2 wherein said belts are made of fluorinated hydrocarbon polymers.

5. An apparatus as set forth in claim 2 wherein said belts are made of silicone rubbers.

6. An apparatus as set forth in claim 2 wherein said belts are made of a tetra-fluoroethylene polymer and the heat dissipative conductance is carbon black.

7. An apparatus as set forth in claim 6 wherein the heat dissipative conductance is copper.

8. In a bread-manufacturing apparatus, the improvements therein which comprise: a four-sided, non-collapsible, endless, dough conveyor belt, the inner sides of which move in the same direction, said belt formed from flexible non-conductive material impregnated with a heat dissipative conductance, and means for producing a high frequency, alternating electric field transversely of said belt.

9. In apparatus for the continuous manufacture of bread, conveyor-shaping means comprising an endless, flexible conveyor belt arranged about a substantial portion of the periphery of an extruded bar of bread dough, said belt permitting the escape of vapors therefrom, high frequency heating means associated with said conveyor-shaping means to supply heat to the extruded dough bar, and means for driving said belt, whereby said dough bar is simultaneously advanced and shaped by said belt and baked by said heating means.

10. Apparatus for the continuous manufacture of bread comprising means for making dough, means for introducing a synthetic leavening agent into the dough, extrusion means for extruding the dough from said dough making means as a leavened dough bar, conveyor-shaping means comprising a plurality of endless flexible conveyor belts arranged about a substantial portion of the periphery of said extruded bar of bread dough, said belt arrangement permitting the escape of vapors therefrom, heating means associated with said conveyor-shaping means to supply heat to the extruded dough bar, said heating means including high frequency heating means and means for supplying radiant heat, and means for driving said conveyor belts, the inner sides of said belts moving in the same direction, whereby said dough bar is simultaneously advanced and shaped by said belt arrangement and baked and browned by said heating means.

11. In apparatus for the continuous manufacture of bread, the improvements therein which comprise: a dough conveyor and means associated with said conveyor to supply heat thereto, said heating means including means for producing a high frequency, alternating electric field transversely of said conveyor and a heat dissipative conductance applied to said conveyor, said heat dissipative conductance being responsive to said high frequency electric field to produce radiant heat energy, whereby said dough is baked by said high frequency electric field and browned by said radiant heat emitted from said heat dissipative conductance.

12. Bread-manufacturing apparatus as claimed in claim 11 wherein said conveyor includes a plurality of endless conveyor belts arranged about a substantial portion of said dough, the inner sides of said belts moving in the same direction, whereby said dough is simultaneously advanced and shaped by said conveyor and baked and browned by said heating means.

13. Apparatus as claimed in claim 9 including means for supplying radiant heat to the dough bar so as to brown said dough bar.

References Cited by the Examiner

UNITED STATES PATENTS

| | | | |
|---|---|---|---|
| 36,134 | 8/1862 | Ambler | 99—90 |
| 1,953,567 | 4/1934 | Reichert et al. | 99—90 |
| 2,023,478 | 12/1935 | Kremer | 107—54.2 |
| 2,054,937 | 9/1936 | Kremer | 107—54.2 |
| 2,179,671 | 11/1939 | Roys | 107—54.2 X |
| 2,179,672 | 11/1939 | Roys | 107—54.2 |
| 2,253,770 | 8/1941 | Duffy | 107—54.2 |
| 2,485,659 | 10/1949 | Robertson | 219—10.41 X |
| 2,678,614 | 5/1954 | Bahlsen | 107—57 |
| 2,740,362 | 4/1956 | Elliott | 107—14.1 |
| 2,812,729 | 11/1957 | Bahlsen | 107—57 |

WALTER A. SCHEEL, *Primary Examiner.*

DONALD LEVY, CHARLES A. WILLMUTH, LUTHER H. BENDER, JOSEPH SHEA, *Assistant Examiners.*